United States Patent
Baker

Patent Number: 5,213,384
Date of Patent: May 25, 1993

[54] BAKER'S PEEL

[76] Inventor: Patrick M. Baker, 13186 Yosemite Ave., S., Savage, Minn. 55378

[21] Appl. No.: 868,022

[22] Filed: Apr. 10, 1992

[51] Int. Cl.⁵ ............................................. A47J 43/28
[52] U.S. Cl. ......................................... 294/7; 294/49
[58] Field of Search ............... 294/7, 8, 9, 10, 32, 294/49, 51, 54.5, 55-57; 15/236.1; 30/136, 142, 324, 328; 366/342, 343; 403/334, 361; 440/101

[56]  References Cited

U.S. PATENT DOCUMENTS

| | | |
|---|---|---|
| D. 246,087 | 10/1977 | Peterson . |
| 754,042 | 3/1904 | Bohn ..................... 294/49 |
| 1,026,034 | 5/1912 | Hanel ..................... 294/49 |
| 1,031,495 | 7/1912 | Walker ..................... 294/7 |
| 1,216,703 | 2/1917 | Kraushaar ............... 294/49 X |
| 1,221,914 | 4/1917 | Schlager ................. 294/56 |
| 1,247,032 | 11/1917 | Surbaugh ............... 294/55 |
| 1,254,096 | 1/1918 | Weisenberg ............ 294/56 X |
| 1,557,884 | 10/1925 | Schlager ................. 294/49 |
| 1,823,159 | 9/1931 | Moure . |
| 1,932,474 | 10/1933 | Penhaligen ............. 294/49 |
| 2,003,541 | 6/1935 | Jawort .................... 294/49 X |
| 2,064,136 | 12/1936 | Winger ................... 294/7 |
| 2,621,957 | 12/1952 | Hartrampf .............. 294/8 |
| 2,800,089 | 7/1957 | Seils . |
| 4,753,472 | 6/1988 | Fout ....................... 294/32 |

FOREIGN PATENT DOCUMENTS

| | | | |
|---|---|---|---|
| 82456 | 12/1956 | Denmark ................ | 294/57 |
| 221865 | 9/1942 | Switzerland ........... | 294/49 |
| 6386 | 4/1888 | United Kingdom .... | 294/49 |

*Primary Examiner*—Johnny D. Cherry
*Attorney, Agent, or Firm*—Donald A. Jacobson

[57] ABSTRACT

This peel is made from metal for ease in cleaning and has a wooden handle to provide heat insulation for the user. The peel has a wedge shaped groove extending from one edge through its center formed into its surface. The maximum depth of the groove is at the peel edge and tapers to the peel plane on the opposite end. One end of the wooden handle is sized and shaped to fit within this wedge shaped groove. The groove increases the strength of the plate and also engages and reinforces the handle. The streamlined shape of the wedge makes it easy to insert or remove the peel from under pans or bakery products. The peel has a linear U-shaped integral extension from the groove which partially encloses the handle. This extension provides additional rigidity for the peel and support for the handle. Integral concave shaped fillets from opposite sides of the extension to the plate which lie in the plane of the plate provide further strength for the extension attachment. The edges of the fillets are bent perpendicular to the plane of the plate for additional rigidity.

3 Claims, 1 Drawing Sheet

BAKER'S PEEL

FIELD OF THE INVENTION

This invention relates to an improved baker's peel for the handling of bakery pans and products in ovens, and particularly for the handling of pizzas.

The invention relates to an improved peel which is formed with a wedge shaped centered groove to provide rigidity with minimum weight. The groove mates with a handle having a rectangular cross-section which insures that the peel will not rotate with respect to the handle to provide maximum stability.

DESCRIPTION OF THE PRIOR ART

Various baker's peels adapted for the purpose of moving bakery pans and products in and out of ovens have been found which are exemplary of the U.S. prior art. They are the following:

| Name of Inventor | U.S. Pat. No. |
| --- | --- |
| R. A. Fout | 4,753,472 |
| S. C. Winger | 2,064,136 |
| Alker | 1,031,495 |
| O. B. Hartrampf | 2,621,957 |
| R. Moure | 1,823,159 |
| D. Peterson | D. 246,087 |
| H. F. Seils | 2,800,089 |

Fout discloses a baker's peel with a plate made of a thin metallic material. A clip is provided to restrain an item on the plate. No structural support members are illustrated in connection with the plate. A clip activation mechanism used to secure or release the items on the plate interferes with a streamline shape which is ideal for peel operation. The handle is circular and provides no purchase for a grip. Winger discloses a household spatula in which the blade will flex in one direction but will strongly resist flexure in response to a force in the opposite direction. Alker discloses a utensil handle formed in a loop and attached to a blade by a rivet. Hartrampf discloses a cake turner with a spring-loaded actuation mechanism which allows the user to turn the cake while maintaining a secure grip on the handle. The blade is secured to a stem by rivets and appears to lack the structural strength for heavy loads. Moure discloses a baker's peel with a reversible handle. The handle is detachably connected to the blade by a U-shaped bolt. The blade is clearly constructed of wood. Peterson's design patent illustrates a combined spatula and peeler. The blade portion does have formed edges to add structural support. The blade and handle appear to be manufactured from a single piece of material. Siels discloses a baker's peel with an improved handle disengagement mechanism attached to the bottom of the peel blade. By attaching the handle to the bottom of the blade, more peeling surface is provided. At the underside of the blade, a metal plate is secured by rivets. Illustrations of a bracket engaging the blade shows that the bracket extends a substantial distance below the blade interfering with the operation of the peel.

None of these inventions utilize a wedge shaped groove to provide additional peel rigidity and strength with no loss of function. Further, none of these inventions teach the use of a handle with a rectangular cross-section to engage a mating wedge shaped groove to provide a stable orientation of the peel when the handle is gripped by hand.

SUMMARY OF THE INVENTION

The instant invention utilizes a peel made of metal to make it easier to keep the peel sanitary and a wooden handle to insulate the user from oven heat. A wedge shaped groove with a rectangular cross-section extends from one edge of the peel through its center. The groove is oriented such as to have a uniform width across the peel with the maximum wedge depth at the peel edge. The groove makes the peel more rigid because of the shape. The groove also receives one end of a matching handle which also has a rectangular cross-section, and which is tapered and sized to fit closely within the groove. An adhesive which is approved for food use secures the handle within the wedge shaped groove. With this arrangement the groove brackets the handle and prevents it from rotating with respect to the peel or from translating in a direction perpendicular to the groove.

While the peel described above is functional, further improvements include an integral U-shaped extension of the peel from the end of the groove which extends outward along and around the handle. This U-shaped extension effectively forms a linear extension of the groove but with a uniform depth throughout its length which is the same as the depth of the groove at the edge of the peel. This extension provides additional strength and support for the handle. The extension is secured to the handle by the adhesive described above and also by a threaded fastener which is recessed on each end. This fastener mechanically reinforces the strength of the handle attachment and prevents translation of the handle along the length of the U-shaped extension and groove.

A further improvement is provided by concave shaped fillets from the plate to both sides of the extension which reinforce the extension attachment. The concave edges of the fillets are bent perpendicular to the plane of the plate to provide additional strength by their shape. The fillet edges are bent in the same direction as the handle but do not extend beyond the handle so they will not interfere with the peel operation.

DESCRIPTION OF THE PREFERRED EMBODIMENT

Figure 1:
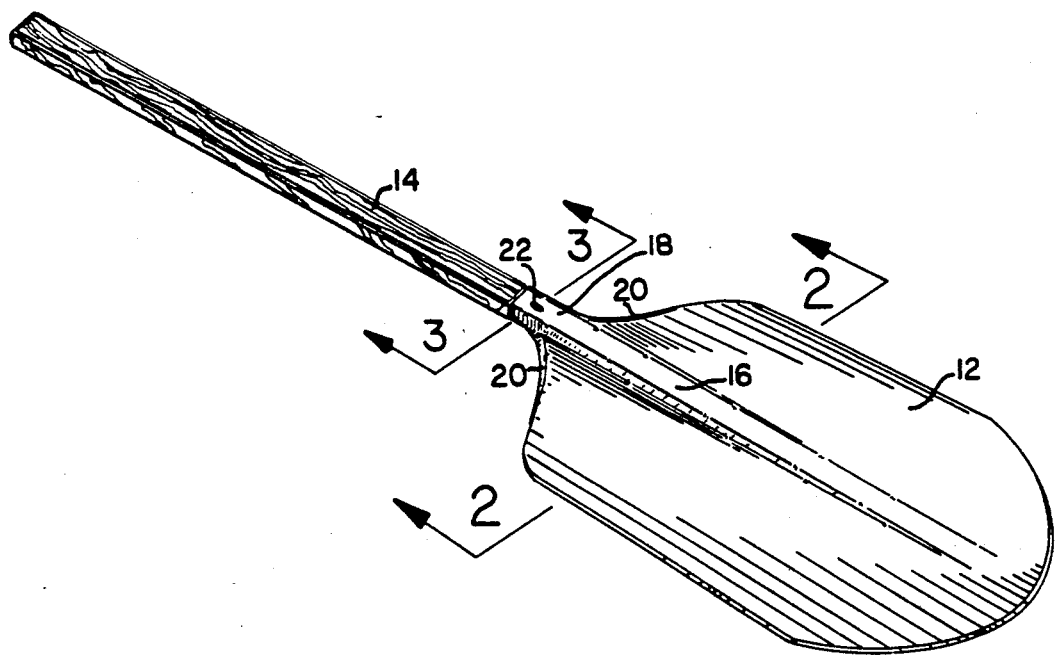
FIG. 1 is an isometric view of the peel.

Referring to FIG. 1 an overview of a peel made up of a plate 12 and handle 14 can be seen. Plate 12 is made of metal and handle 14 is made of wood. A single planar sheet of metal is blanked to the proper shape and then formed into plate 12 having a wedge shaped groove 16 formed into the surface, and having integral U-shaped extension 18 and concave fillets 20. Wedge shaped groove 16 has a rectangular shaped cross-section which tapers from a maximum depth at the edge of plate 12 on one end, where extension 18 is connected, to the plane of plate 12 on the opposite interior end. The rectangular cross-section of groove 16 is wider than its maximum depth. U-shaped extension 18 has a uniform depth along handle 14 which is the same as the maximum depth of groove 16 adjacent to the extension.

Figure 2:
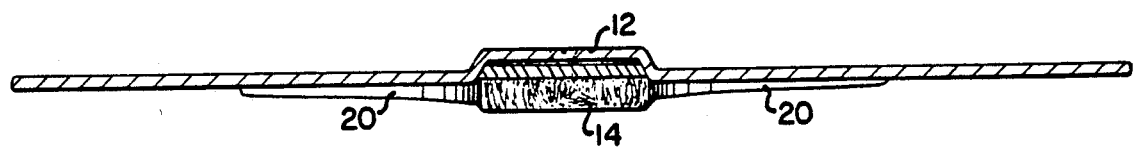
FIG. 2 is a cross-section of FIG. 1 taken across 2—2.

FIG. 2 shows the taper of handle 14 which fits tightly within wedge shaped groove 16. The edges of fillets 20 are bent perpendicular to plate 12 to provide additional strength. Fillets 20 do not interfere with the action of the peel, since they lie within the dimensions of handle 14 in that direction.

Figure 3:
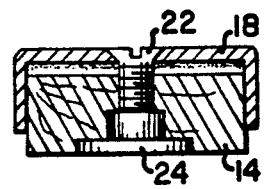
FIG. 3 is a cross-section of FIG. 1 taken across 3—3.

In FIG. 3 a mechanical threaded fastener made up of a bolt 22 and a mating stud 24 can be seen. The flared head of bolt 22 is recessed into extension 18 and stud 24 is recessed into handle 14 so the fastener will not interfere with the operation of the peel.

The use of metal plate 12 for the body of the peel has a number of advantages. One is the fact that metal is considerably more sanitary than wood. Another is the fact that metal can readily be formed with a wedge shaped groove 16 across the center of plate 12 to provide an increase in rigidity for a given metal gage by its shape.

Groove 16, in addition to increasing the rigidity of plate 12, also provides an enclosure for handle 14, so the handle cannot rotate with respect to the plate because of the mating rectangular cross-sections of the groove and the handle. Extension 18 provides increased support for handle 14 and has the same advantages. Groove 16 is wedge shaped along the handle so the peel can readily be slid under pans and bakery products with the groove on the upper side as shown in FIG. 1. U-shaped extension 18 and bent fillets 20 increase the strength and rigidity of the peel greatly with a minimum of weight. As discussed previously, fillets 20 are bent perpendicular to the plane of plate 12 to increase their rigidity, but since they do not extend beyond handle 14 they do not interfere with sliding the peel under pans and bakery products. All of these features are obtained by a single metal plate 12 which can readily be blanked and formed into the proper size and shape, and a wooden handle 14 having the proper shaped end to mate with extension 18 and wedge shaped groove 16 in the plate. This peel overcomes the disadvantages of the prior art using only two parts joined together simply with adhesive and a single threaded fastener. Plate 12 can be fashioned from any number of metals or from a rigid heat resistant material other than metal; however, stainless steel is preferred because of its strength and the ease of cleaning this metal. The preferred material for the handle is wood; however any non-heat conducting material with the necessary strength and heat resistance could be substituted. The resulting peel is sanitary and light weight, and its wedge shape being aligned with the handle makes it easy to slide the peel under bakery products or pans in an oven.

While this invention has been described with reference to an illustrative embodiment, this description is not intended to be construed in a limiting sense. Various modifications of the illustrative embodiment, as well as other embodiments of the invention, will be apparent to persons skilled in the art upon reference to this description. It is therefore contemplated that the appended claims will cover any such modifications or embodiments as fall within the true scope of the invention.

I claim:

1. A baker's peel for the handling of bakery pans and bakery products in ovens, comprising:
    a) a generally planar rigid metal plate having a linear groove with a U-shaped cross-section formed in the surface thereof, the groove having sides generally parallel to each other and generally perpendicular to the plane of the metal plate, having a planar portion extending between the sides, having a first end at an edge of the plate, and having an opposite second end at the center of the plate; the planar portion of the groove extending between the side being inclined with respect to the plane of the plate such as to form a wedge shape with a maximum offset at the first end tapering linearly to the plane of the plate at the opposite second end; and
    b) a handle formed of a rigid heat resistant material which is a non-conductor of heat, said handle having a wedge shaped first end which is sized and shaped to fit within the groove in said plate such that the handle will extend outward therefrom generally parallel to the plane of said plate; and
    c) attachment means for attaching said handle to said plate.

2. A baker's peel as in claim 1 with said plate having an integral linear U-shaped extension therefrom which is aligned with the first end of the groove, said U-shaped extension having the same dimensions as said groove at the first end thereof and extending outwardly therefrom such that the U-shaped extension forms a linear outward continuation of said groove.

3. A baker's peel as in claim 2 wherein said attachment means comprises a threaded bolt with a flared head and a mating threaded stud with the handle and U-shaped extension having holes sized to receive the bolt and being arranged such that when the handle is mounted in place, the holes through the handle and U-shaped extension are aligned with the bolt head recessed in the U-shaped extension and the stud recessed in the handle.

* * * * *